United States Patent Office 3,558,786
Patented Jan. 26, 1971

3,558,786
FEED COMPOSITION AND ITS UTILIZATION
Robert T. McCarty, Fort Worth, Tex., assignor to Geigy Chemical Corporation, a corporation of New York
No Drawing. Filed Aug. 15, 1963, Ser. No. 302,472
Int. Cl. A23k 1/16
U.S. Cl. 424—319                                15 Claims This invention is that of a ration or feed composition for fowl, which composition manifests improved or enhanced feed conversion. The invention embraces also the method of improving or enhancing feed conversion by fowl by having the fowl consume along with its ordinary feed an agent added thereto effective to enhance its feed conversion.

Feed conversion in a fowl specie is the number of pounds consumed of the particular feed composition used, to produce a pound of weight gain in the individual fowl specie.

By "ordinary feed" for fowl, as used herein and in the appended claims, is meant any of the commonly and usually used practical commercial feeds or feed mixtures ordinarily fed to fowl such as broiler chicks as well as egg-laying hens and other particularly quantity or mass fed fowl species.

More particularly, the invention product-wise is that of a feed composition for fowl, containing as by far its major constituent an ordinary or practical feed for fowl and having incorporated therein a minor, effective and nontoxic proportion of a feed conversion enhancing agent having the characteristics described more fully shortly below, which conversion enhancing agent is present in an amount from at least sufficient to promote enhanced feed conversion of the intake of said feed composition by the fowl's daily consumption of it, to below that which would produce toxic manifestations under the conditions of use.

Process-wise the invention is that of the method of enhancing feed conversion in fowl, which method comprises subjecting the fowl to regular consumption of a fowl feeding composition containing an ordinary or practical feed for fowl, which composition has incorporated therein a feed conversion enhancing agent having the characteristics given below and in the same proportion to the content of the ordinary feed as recited above in relation to the feed compositions of the invention.

The invention, in both of its composition and method aspects, is applicable particularly to raising of broiler chickens from freshly hatched chicks as well as to feeding of egg-laying hens. The feed compositions and method of the invention are not limited to use solely by the foregoing, but are applicable also with other fowl and broiler chicks or such hens of any specie.

Currently there still continues not only the increasing numbers of a species of fowl in individual flocks, but also the regularly increasing extent of such flocks of different species of fowl over this country and others. That is seen particularly in the growing of broiler chickens raised from freshly hatched chicks, and even in the case of flocks of egg-laying hens. The volume in these fields has been so increasing that application of automation procedures is increasing extensively. Such increasing numbers in flocks and increasing extent of such flocks of necessity provokes increasing interest in improved feed compositions. Such interest then should be high in feed compositions that manifest enhanced feed conversion. That is so because each added feature of, and increment in, enhanced feed conversion provides a desirable advantage to the fowl producer.

Considered broadly, the fowl-feeding composition of the invention comprises, as by far its major portion, an ordinary feed for fowl and incorporated therein a small amount of at least one (i.e., one or more) feed conversion enhancing agent having the formula

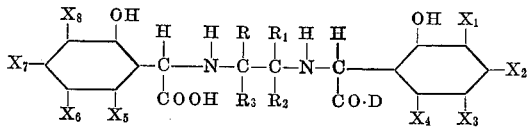

wherein any of R through $R_3$ separately is hydrogen, an alkyl group having under 13 carbon atoms, a hydroxy(lower)alkyl group, or alternatively a divalent lower polyalkylene group having under 5 carbon atoms substituted for either pair of R and $R_1$ or $R_2$ and $R_3$; and any of $X_1$ through $X_8$ is hydrogen or an alkyl group with one through ten carbon atoms, a lower alkoxy, lower hydroxyalkyl, carboxyl, hydroxyl, nitro, free amino, cyano, or sulfo group or a halogen; D is the free amino or hydroxyl group; said small amount of said added enhancing agent being at least sufficient to be effective to enhance the feed conversion and insufficient to provoke toxic manifestations under the conditions of use of the feed composition.

The foregoing various applicable feed conversion enhancement agents are described more fully in U.S. Pats. Nos. 3,005,848 and 3,028,407.

The small amount of applicable feed conversion agent generally can be under one-half percent of the entire feed composition. More often it may be under one-tenth percent of the feed composition, because the safely tolerable content often is well above the range for best weight gain and feed conversion.

These applicable feed conversion enhancing agents manifest a high margin of safety. For example, ethylenediamine-N,N'-di-(ortho-hydroxyphenylacetic acid), hereinafter briefly called EDDHA or Chal 138 and a presently significant example of these addition agents, is highly nontoxic. It provokes visually noticeable toxic symptoms, e.g. staggering or inhibited righting effects (i.e., the ability readily to stand up normally) or death apparently only when included to the extent of at least about 5000 grams per ton of suitable ordinary feed for fowl.

Thus, EDDHA can be incorporated into a feed composition of the invention to the extent of as much as 1200 grams per ton of feed. That is so especially without adding to the feed composition trace metal ions such as iron, manganese, copper and zinc in excessive amounts such as 40 parts per million (i.e., p.p.m.) per ton of feed (that is to say, above the natural content of such trace element minerals ordinarily found in the individual constituents from which the feed is prepared). Without also adding these trace metal elements, EDDHA may be incorporated even to the extent of about 1500 p.p.m. of feed without causing any toxic effects.

Any of the herein disclosed feed conversion enhancement agents can be added in a minimum amount at least sufficient to enhance the feed conversion. No generally applicable strictly specific numerical minimum can be given because the sufficient minimum could vary with each specific one of such herein disclosed agents and in accordance with the respective composition as to the other ingredients of each different starting ordinary or practical fowl or broiler feed composition (i.e., without or before incorporation of the selected enhancement agent).

In some instances, about 50 grams of the feed conversion enhancement agent per ton of fowl-feed composition can provide noticeable enhanced feed conversion. With other feed compositions, it might be found to be more desirable to use at least about 100 grams per ton of the feed. Present indications, specifically with EDDHA, are that use of from about 150 to about 250 grams of it per ton of a good practical fowl-feed composition (such as that used to make Example 1 below) provides the best weight gain and shows the best feed conversion result, for example, with sexed Vantress Cross chicks in an eight weeks test period.

When the aforementioned trace metal elements are added jointly, for example, to the extent of from about 4 to about 20 p.p.m. of each per ton of feed, then up to about 800 grams of EDDHA may be safely incorporated per ton of ordinary or basal ration feed. The amounts of each of these trace elements which may be included jointly can be increased proportionately to about 40 p.p.m. as the amount of EDDHA is decreased proportionately to about 400 grams of EDDHA per ton of feed. The possibility of including 40 p.p.m. of each of said four trace metal elements is even better as the EDDHA content is decreased below that level, and is certain at about 300 or better still at 250 grams of EDDHA per ton of fowl-feed composition of the invention.

As already indicated above, the number of variables involved, such as possible variations in ordinary feeds and basal ration constitution and in different individual species of fowl, prevent setting a precise numerical limitation for the minimum content of the feed conversion enhancement agent and especially also for its maximum tolerable concentration. However, any reasonably significant minimum content of such addition agent can provoke some enhancement in feed conversion. Thus, the nature of the invention in relation to the nature of the material with which it is used, namely, a nonrigidly standardizable animal species, the invention justifies permitting the minimum to be identified as an amount of the feed conversion enhancement agent sufficient at least to provide some determinable feed conversion enhancement.

Feed conversion enhancement can be determined by a readily conductable procedure. It involves exposing two separate groups of the same fowl specie, with each group having substantially identical starting characteristics to free access feeding (i) with one of them on a specific basal ration for a given significant period of time, and (ii) with the other group of them on the same basal ration but in which there was incorporated a selected desired proportion of the feed conversion enhancement agent to be tested, and with each group so feeding for the identical time period; and then for each group determining (a) the total weight gain for the period and (b) the total quantity of the respective feed composition consumed during the period. Then the feed conversion is the quotient obtained by dividing the number of pounds of feed consumed by a group by its total weight gain, for the period.

Thus also, the nonstandardizable nature of the invention warrants identifying the maximum of the range for the amount of feed conversion enhancement agent to be added as the maximum safely tolerable amount for the specific specie of fowl under the feeding conditions in relation to the other content of the feed composition. Such other content of the feed composition includes its natural or normal content of the trace metal elements and whether any of them, and which, are added independently separately, for example, as water-soluble salts thereof, and the respective extent of addition of any of those so added.

A reasonable guiding range of content of the feed conversion enhancement agent may be from about 50 grams to about 1350 grams per ton of the specific ordinary fowl-feed or basal ration, which upper limit is applicable when the composition is without any separately added trace metal elements, and in which case the conversion enhancement agent is present in excess of about 800 grams per ton of feed; and with the content of said enhancement agent decreasing relatively proportionately below said last figure as the content of independently added trace metal elements increases to 40 p.p.m. of each of them present as the content of the enhancement agent is decreased to about 400 grams per ton and below that.

The fowl-feed compositions of the invention can be prepared by any suitable and convenient method that enables adequately incorporating a suitable feed conversion effective amount of the selected feed conversion enhancing agent into any ordinary fowl-feed such as any of the basal rations commonly fed to the particular fowl specie concerned.

The feed conversion enhancing agent more often is available as a finely divided powder. Hence, it may not be efficient to add it directly to the total of the various substances of which the starting feed is to be constituted. Instead, it can be more effective first to prepare a suitable quantity of a premix of said enhancement agent by admixing it with one of the feed ingredients, which is at least in granular form. Then, an amount of such premix as would be needed to provide the required amount of the feed conversion enhancement agent for the finished feed composition is admixed with the other ingredients needed to prepare the finished fowl-feed composition as a product of the invention.

An effective premix can be prepared by admixing said enhancement agent, for example, with ground yellow corn, sometimes called yellow corn meal. An example of a premix for vitamin K to be incorporated in chicken and turkey feed is seen in column 1 of U.S. Pat No. 3,079,260.

Examples of fowl-feed compositions of the invention are illustrated by, but not restricted to, the following:

EXAMPLE 1

5.3 pounds of EDDHA were uniformly admixed with 51.7 pounds of ground yellow corn (i.e., yellow corn meal) to give 57 pounds of a premix containing 42.2 grams of EDDHA per pound of premix. A fowl-feed composition was prepared by uniformly admixing the below listed respective amounts of the following ingredients:

| | Pounds |
|---|---|
| Ground yellow corn | 1105 |
| Soybean meal (50% protein) | 540 |
| Animal fat (stabilized #2 tallow) | 100 |
| Menhaden fish meal | 60 |
| Fish solubles, condensed (50% solids) | 40 |
| Alfalfa leaf meal (20% protein) | 60 |
| Dicalcium phosphate (20% P, 24% Ca) | 40 |
| Oyster shell flour | 19.9 |
| Salt | 10 |
| Vitamin premix | 20 |
| EDDHA yellow corn premix | 5.1 |

This fowl-feed composition contains 215 grams of EDDHA per ton of feed. The feed composition was prepared by adding the 5.1 pounds of the EDDHA yellow corn meal premix and the vitamin premix to the other ingredients and obtaining the final fowel-feed composition by admixture of the ingredients in similar manner to that used in admixing an ordinary feed (i.e., lacking the EDDHA) of like composition but without EDDHA.

The vitamin premix contained the following respective milligram quantities of vitamin A, 80; vitamin $D_3$, 7.2; vitamin E, 50; choline chloride, 865; riboflavin, 7; niacin, 31; pantothenic acid, 14; vitamin $B_{12}$, 0.01; and 50 milligrams of antibiotic.

Allowing a trial group of sexed Vantress Cross chicks to feed with free access on the foregoing fowl-feed composition for a period of eight weeks develops a 5% lower feed conversion (i.e., pounds of feed required to produce a pound of weight gain) than that by a like size group of the same specie of chicks fed on the corresponding ordinary feed of the same composition but without any EDDHA.

EXAMPLE 2

A fowl-feed composition was prepared by uniformly admixing the below listed 9.5 grams of the EDDHA yellow corn meal premix used in Example 1 with the remainder of the below listed respective amounts of the following other ingredients:

| | Pounds |
|---|---|
| Ground yellow corn | 1205 |
| Soybean meal (50% protein) | 560 |
| Dehydrated alfalfa meal (17% protein) | 40 |
| Condensed fish solubles (50% solids) | 50 |
| Dried whey product (50% lactose) | 50 |
| DL-methionine | 1.0 |
| Calcium carbonate (38% Ca) | 33 |
| Dicalcium phosphate (20% P, 24% Ca) | 35 |
| Salt | 10 |
| Additional vitamins | 6.5 |
| EDDHA yellow corn meal | 9.5 |

The foregoing fowl-feed composition contains 400 grams of EDDHA per ton. Without its EDDHA, it corresponds practically completely with the standard broiler ration proposed by the Nutrition Council (AFMA). That latter ration includes also 2 pounds of trace mineral ingredients per ton.

The respective ordinary feed (i.e., the fowl-feed composition without its EDDHA) in each of the foregoing examples can be replaced by any other ordinary feed in common use either in broiler feeding, whether for chicken broilers or those of any other fowl species concerned. Alternatively, any of the individual constituents of any of those ordinary feeds included in the fowl-feed compositions of any of these examples can be replaced by any other constituent ordinarily used or available to provide the same nutritional constituent of such feed.

In addition, the content of the specific feed conversion enhancement agent of any of those examples can be replaced by some other quantity of the same agent as is considered suitable for the specific specie or fowl to which it is to be fed and depending on whether or not any substances providing trace metal elements are added and to what extent. The quantity of feed conversion enhancement agent to use when substances providing trace metal elements are added is to be guided by the further above expressed realtionship of content of the enhancement agent with respect to the quantity of specific trace metal element or elements included and the quantity of each respectively.

Similarly, the specific feed conversion enhancement agent of the invention can be replaced in part or as a whole by any other of the agents hereinabove disclosed as being applicable in the fowl-feed compositions of the invention.

Thus, each of the above two specific examples of fowl-feed compositions, and any of the recited possible modifications of them, can be considered as repeated in full herein with their respective quantities of EDDHA replaced in part or as a whole respectively by ethylene bis(alpha-imino-2-hydroxy-5-methyl-phenylacetic acid) or ethylene bis(alpha-imino-2-hydroxy-5-chlorophenylacetic acid) or ethylene bis(alpha-imino-2-hydroxy-3,5-dichlorophenylacetic acid) or ethylene bis(alpha-imino-ortho-hydroxy-phenylacetic acid)-monoamide or ethylene bis(alpha-imino-ortho-hydroxy-5-methyl-phenylacetic acid)-monoamide or ethylene-bis(alpha-imino-ortho-hydroxy-5-chloro-phenylacetic acid)-monoamide.

The addition of the trace mineral element manganese to the extent of up to 40 p.p.m. along with 400 grams of EDDHA in a fowl-feed composition of the invention provoked the highest retention by the feeding broiler chicks of the trace mineral elements copper, manganese and zinc contained in constituents of the composition, with next higher retention of iron. The retention of copper by the chicks is strikingly enhanced when the element manganese is included to the extent of 40 p.p.m. with the EDDHA presence not above about 800 grams per ton.

Allowing egg-laying hen chickens free access feeding on a fowl-feed composition of the invention apparently reduced the percent of "cracks" (i.e. eggs that cracked as they landed on the wire mesh in the hen houses). These compositions also provoked increasing in the uniformity of pigmentation in the yoks of the eggs laid by the flock.

Broiler chicks on free access feeding on a fowl-feed composition of the invention showed improved skin pigmentation over that observed on the same species broiler chicks similarly fed the same feed but without any EDDHA.

Incorporating 208 grams of manganous sulfate ($5H_2O$) in 5.1 pounds of the EDDHA yellow corn meal premix described at the beginning of Example 1 and then substituting the resulting mixture for the 5.1 pounds of the EDDHA yellow corn premix of Example 1, provides a fowl-feed composition containing 40 p.p.m. of the essential trace element manganese. Similar compositions can be prepared with the same quantity of that manganous sulfate and the constituents of Example 2 or those of any other ordinary feed.

Instead, of manganous sulfate, there can be used in such fowl-feed compositions any other nontoxic (i.e., in the concentration used at the feeding plan or regimen followed), water-soluble manganous salt of the type suitable and ordinarily used for incorporating essential trace metal elements into food or vitamin preparations or similar compositions for animal consumption, for example, the acetate, citrate, gluconate, and succinate.

Where necessary to supplement low content of any of these essential trace metal elements (e.g., iron, copper, manganese and zinc) found in the food constituents of Examples 1 and 2 or of any ordinary feed whose feed conversion is to be enhanced according to the invention, any such just described nontoxic water-soluble salt of any of these essential trace minerals can be added similarly.

The EDDHA of Examples 1 and 2 can be replaced, for example, in part by up to a few percent of ethylenediamine-N,N'-di-(ortho - hydroxyphenylacetic acid) - monoamide. Each of those examples then are considered as if recited in full with such substitution. Similarly, the same examples can be considered as repeated in full with any other and larger part of their EDDHA replaced by its said monoamide, and even as entirely replaced by this monoamide.

While the invention has been explained by detailed description of certain specific embodiments of it, it is understood that various modifications and substitutions can be made in any of them within the scope of the appended claims which are intended also to include equivalents of such embodiments.

What is claimed is:

1. A fowl-feed composition manifesting enhanced feed conversion over a corresponding ordinary feed for fowls, which composition comprises an ordinary feed for fowls as by far its major portion and incorporated therein a minor portion generally under about one-half percent by weight of the feed composition of at least one feed conversion enhancing agent in an amount from at least sufficient to enhance the feed conversion of the composition to below that which produces toxic manifestations under the conditions of use with the specific specie of fowl; which feed conversion enhancing agent has the formula:

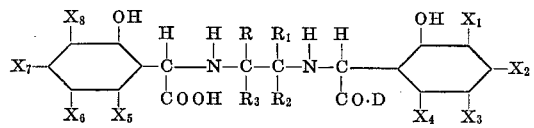

wherein any of R through $R_3$ separately is a member of the class consisting of hydrogen, an alkyl group having under 13 carbon atoms, a hydroxy(lower)alkyl group, and one of the pairs of (i) R and $R_1$ and (ii) $R_2$ and $R_3$ being a divalent lower polyalkylene group having under 5 carbon atoms; and any of $X_1$ through $X_8$ is a member of the class consisting of hydrogen, an alkyl group with one through ten carbon atoms, a lower alkoxy, lower hydroxyalkyl, carboxyl, hydroxyl, nitro, free amino, cyano, and sulfo group, and a halogen; and D is a member of the class consisting of the free amino and hydroxyl group.

2. A fowl-feed composition as claimed in claim 1, wherein the feed conversion enhancing agent consists essentially of ethylenediamine - N,N' - di-(ortho-hydroxyphenylacetic acid).

3. A fowl-feed composition as claimed in claim 1, wherein the feed conversion enhancing agent is present from about 800 to about 1500 grams per ton of the composition when it lacks any water-soluble ingredients that introduce essential trace mineral elements over and above the content of any of them naturally found in the other constituents of the composition.

4. A fowl-feed conversion composition as claimed in claim 1, wherein the feed conversion enhancing agent consists essentially of a mixture of ethylenediamine-N,N'-di-(ortho-hydroxyphenylacetic acid) and ethylenediame-N,N'-(di-ortho-hydroxyphenylacetic acid)-monoamide.

5. A fowl-feed conversion composition as claimed in claim 1, wherein the feed conversion enhancing agent consists essentially of ethylenediamine-N,N'-di-(ortho-hydroxyphenylacetic acid)-monoamide.

6. A fowl-feed composition as claimed in claim 1, wherein the feed conversion enhancing agent is present to a maximum of about 800 grams per ton, and said composition includes per ton of it also a water-soluble salt of at least one of the essential trace metals copper, iron, manganese and zinc and to the extent to provide from at least about 20 parts to a maximum of about 40 parts per million respectively of any of these essential trace metals; said salt being of the type suitable for introducing essential trace elements for animal consumption.

7. A fowl-feed composition as claimed in claim 6, wherein the feed conversion enhancing agent is present to the extent of from about 50 to about 400 grams per ton of said composition.

8. A fowl-feed composition as claimed in claim 7, wherein the feed conversion enhancing agent is present within the range of from about 150 to about 250 grams per ton of the composition.

9. A fowl-feed composition as claimed in claim 6, wherein a water-soluble salt of manganese, of the type suitable for introducing essential trace mineral elements for animal consumption, is included along with a said water-soluble salt of any of the others of said trace metals, and to the extent to introduce manganese up to about 40 parts per million of said composition.

10. A fowl-feed composition as claimed in claim 9, wherein there also is included a said water-soluble salt of copper to the extent to introduce said copper up to about 40 parts per million of said composition.

11. The method of enhancing feed conversion in fowl, which method comprises allowing said fowl to consume as a major part of their solid feed intake, a fowl-feed composition as claimed in claim 1.

12. The method of enhancing feed conversion in fowl, which method comprises allowing said fowl to consume as a major part of their solid feed intake, a fowl-feed composition as claimed in claim 3.

13. The method of enhancing feed conversion in fowl, which method comprises allowing said fowl to consume as a major part of their solid feed intake, a fowl-feed composition as claimed in claim 6.

14. The method of enhancing feed conversion in fowl, which method comprises allowing said fowl to consume as a major part of their solid feed intake, a fowl-feed composition as claimed in claim 9.

15. The method of enhancing feed conversion in fowl, which method comprises allowing said fowl to consume as a major part of their solid feed intake, a fowl-feed composition as claimed in claim 10.

References Cited
UNITED STATES PATENTS

| | | | |
|---|---|---|---|
| 2,604,401 | 7/1952 | Ely | 99—4 |
| 2,703,285 | 3/1955 | Luther | 99—2 |
| 2,841,495 | 7/1958 | Stewart | 99—2 |
| 2,875,129 | 2/1959 | Bersworth et al. | 99—2X |
| 2,960,406 | 11/1960 | Cardon | 99—2 |
| 3,072,529 | 1/1963 | Sanders et al. | |
| 3,124,459 | 3/1964 | Erwin. | |
| 3,249,442 | 5/1966 | Keyes et al. | 99—7X |

OTHER REFERENCES

Chemical Abstracts, vol. 54, p. 22501i, 1960,

Freedman et al.: J. Am. Chem. Soc., vol. 80, pp. 530–536 (1958).

Morrison, Feeds and Feeding, 22 ed., pp. 930, 931, 940, 941, The Morrison Publishing Co. Ithaca, N.Y. (1957).

A. LOUIS MONACELL, Primary Examiner

J. M. HUNTER, Assistant Examiner

U.S. Cl. X.R.

424—304